United States Patent [19]

Bovino et al.

[11] 4,401,102
[45] Aug. 30, 1983

[54] FLY TACKLE STEAMER

[76] Inventors: Jerald A. Bovino, 5339 Brooklawn, Toledo, Ohio 43623; Joseph A. Bovino, 218-10 68th Ave., Bayside, N.Y. 11364

[21] Appl. No.: 255,689

[22] Filed: Apr. 20, 1981

[51] Int. Cl.³ .............................................. F24D 1/00
[52] U.S. Cl. ................... 126/369; 431/253; 43/1; 118/429
[58] Field of Search ............... 126/369, 363; 431/156, 431/253; 43/1; 118/428, 429, 503; 239/136, 129; 159/32, 34, 42; 206/229, 350

[56] References Cited

U.S. PATENT DOCUMENTS

| 167,830 | 9/1875 | Ferris | 126/369 |
| 2,469,778 | 5/1949 | Morici | 126/369 |
| 2,664,854 | 1/1954 | Talbot | 118/429 X |
| 2,861,897 | 11/1958 | Hendrixson | 118/429 X |
| 3,023,748 | 3/1962 | Bruskin | 431/253 X |
| 3,122,452 | 2/1964 | Oakes | 118/428 |
| 3,965,605 | 6/1976 | Allen | 43/1 |

FOREIGN PATENT DOCUMENTS 2904538 8/1980 Fed. Rep. of Germany ...... 431/253

Primary Examiner—Samuel Scott
Assistant Examiner—Randall L. Green
Attorney, Agent, or Firm—Wilson, Fraser, Barker & Clemens

[57] ABSTRACT

An apparatus for the steam cleaning and rejuvenation of fishing tackle at stream side comprises a water containing vessel having an upwardly opening, constricted mouth, a clamp for retaining a conventional cigarette type lighter below the bottom surface of the vessel. Fishing flies may be held above the mouth to be cleaned and rejuvenated by steam escaping therefrom by means of a magnetic annulus defining the mouth, or a mechanical clip attached to the vessel adjacent the mouth.

12 Claims, 3 Drawing Figures

U.S. Patent        Aug. 30, 1983        4,401,102
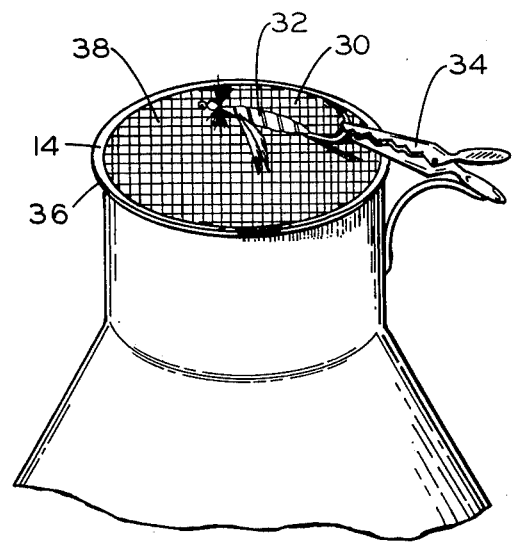
FIG. 2
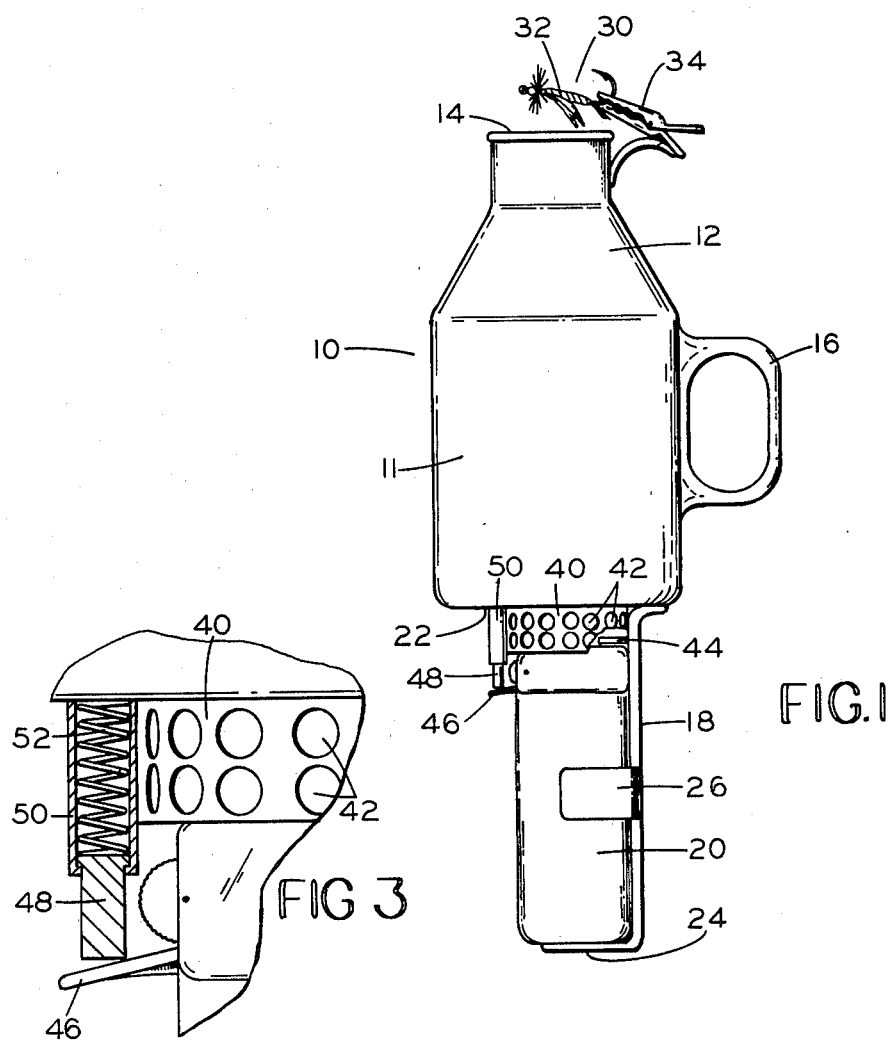
FIG. 1
FIG 3

FLY TACKLE STEAMER

BACKGROUND OF THE INVENTION

1. Field of the Invention

The invention provides a compact, portable apparatus for renovating fishing tackle, in particular, the hackle portion of fishing flies.

2. Description of the Prior Art

A typical fishing fly comprises a hook and an attached hackle including natural or artificial hairs, filaments or feathers. With continued use, the hackle often becomes soiled or matted, and will no longer effectively attract fish or float on the surface of the water.

U.S. Pat. No. 3,122,452, to Oakes, discloses a container for an oil dressing for fishing flies by which a fly can be immersed in the oil dressing without the liklihood of spilling the oil or losing the fly. The oil dressing is intended to cause the fly to float on the water's surface.

An oil dressing itself may cause the hackle to become matted, detracting from its appearance. There is a need, therefore, for a convenient portable apparatus, with which fishing flies can be cleaned and renovated.

SUMMARY OF THE INVENTION

It is an object of this invention to provide a compact apparatus for the renovation of soiled and matted fishing fly tackle by the application of steam.

An apparatus embodying the invention comprises a small water-containing vessel having an upwardly opening neck. Magnetic or mechanical clamping means are provided adjacent the neck for holding a fly hackle directly above the neck opening. Means are provided for attachment of a conventional cigarette lighter to the vessel, whereby water within the vessel can be heated to boiling.

In use, the compact apparatus and the attached lighter can be conveniently hand-held by the fisherman at stream side. A fishing hackle secured above the neck opening can be readily renovated by steam escaping therefrom.

BRIEF DESCRIPTION OF THE DRAWINGS

FIG. 1 is a side elevational view of a fishing tackle steamer embodying the present invention, showing a pocket lighter attached thereto;

FIG. 2 is an enlarged scale perspective view of the open mouth of the container.

DESCRIPTION OF THE PREFERRED EMBODIMENT

As illustrated in the drawing, an apparatus according to the invention comprises a vessel 10 adapted for containing water. The vessel 10 includes a lower, generally cylindrical portion 11 and an upper portion 12 which tapers upwardly and inwardly toward an upwardly opening mouth 14. A handle 16 may be conveniently provided.

The steamer apparatus includes a bracket 18 provided as a means for retaining a heating source, such as a conventional, commercially available, disposable butane lighter 20, for example, in a predetermined spaced relationship from the bottom surface 22 of the vessel 10. The bracket 18 may be formed of sheet metal and secured to the vessel 10 by any suitable means, such as spot welding. The bracket 18 includes a lower panel 24 adapted to support the bottom of the disposable lighter 20. The bracket 20 further includes a resilient clamp member 26 which may be formed of spring steel, for example, and secured to the bracket 18 by suitable means, or be integrally formed therewith. The resilient clamp 26 is adapted to grippingly engage the sides of the lighter 20, thereby holding it within the bracket 18 at the desired position relative to the vessel 10.

This position of the lighter 20 is such that the flame of the lighter 20 impinges upon the bottom surface 22 of the vessel 10, heating water contained therein to boiling. The upwardly rising steam thereby produced is concentrated by the tapered portion 12 of the vessel 10, and escapes from the relatively constricted mouth 14. The steam is directed to the hackle portion of fishing flies retained above the mouth 14, to restore the nap of the hackles.

Means are provided for holding a fishing fly 30 above the mouth 14 of the steamer apparatus in such a position that the steam escaping from the mouth 14 will contact the hackle portion 32 of the fly 30, to cleanse and rejuvenate the same. Thus, a clip 34 is secured to the vessel 10 adjacent the mouth 14, as illustrated in detail in FIG. 2. In addition, the annulus 36 defining the open mouth 14 of the vessel 10 may be magnetic, whereby fishing fly hooks can be conveniently attached and removed from a position over the open mouth 14. To prevent the entry of the fishing tackle into the vessel 10, the mouth 14 may be covered by a metallic screen 38.

To shield the flame of the lighter 20 from wind, an annular shroud 40 is provided, depending from the bottom surface 22 of the steamer vessel 10. The shroud 40 is constructed and arranged to receive the upper portion of the lighter 20, and to surround the flame when the lighter is ignited. A plurality of apertures 42 are formed through the shroud to admit air to maintain combustion. The shroud 40 is preferably formed of stamped sheet metal, and is secured to the vessel 10 by any suitable means, such as spot welding.

An inwardly projecting abutment 44 is integrally formed with the shroud, spaced below the bottom surface 22 of the steamer vessel 10. The abutment 44 is arranged to locate the lighter 20 at the appropriate distance below the bottom surface 22, for most efficient heating of the water within the vessel 10.

A conventional commercially available butane cigarette lighter with which the steamer apparatus is designed to cooperate includes a valve actuating lever 46 which must be continuously depressed to maintain the flame. Therefore, in order to free the angler's hand for manipulation of other tackle, a spring operated piston 48 is mounted adjacent the shroud 40 in a position to engage the lever 46 of the lighter 20. As illustrated, the piston 48 is mounted for axial movement within an annular housing 50. The piston 48 is biased downwardly by a helical spring 52 within the housing 50. In operation, the angler ignites the lighter in the normal manner, using his thumb to depress the lever 27. The angler then places the lighter 20 in position within the clamp 26, while displacing the piston 48 upwardly with his thumb, against the bias of the spring 52. When the lighter 20 is thus in place, the angler withdraws his thumb, simultaneously allowing the piston 48 to move downwardly under the urging of the spring 52, thereby maintaining the lever 46 continuously depressed.

The invention thus provides a compact steaming apparatus for cleaning and rejuvenating fishing fly tackle, especially hackle portions which may become soiled and matted. Because of its compact dimensions, the steamer may be readily used by the fishing enthusiast at stream side, as necessary. The invention offers several advantages important for such an apparatus adapted to be used at stream side. The magnetic annulus 36 provides a simple and reliable means for securing fishing flies over the mouth 14 of the vessel 10, with a minimum of fumbling and the attendant possibility of loss of fishing tackle. The utilization of a readily available disposable butane lighter 20 provides a further point of convenience to the fisherman who may already be laden with specialized equipment and tackle.

In accordance with the provisions of the patent statutes, the principle and mode of operation of the apparatus have been explained and what is considered to represent its best embodiment has been illustrated and described. It should, however, be understood that the invention be practiced otherwise than as specifically illustrated and described without departing from its spirit and scope.

What is claimed is:

1. An apparatus for steam treatment of fishing flies comprising a water containing vessel having an upwardly opening mouth, means adjacent said mouth for retaining the hackle portion of a fishing fly over said mouth, and resilient clamping means attached to said vessel for retaining a removable heat source in a predetermined spaced relationship to the bottom surface of said vessel.

2. The apparatus defined in claim 1 wherein said removable heat source is a cigarette lighter.

3. The apparatus defined in claim 1 including magnetic means adjacent said upwardly opening mouth for retaining fishing flies.

4. The apparatus defined in claim 3 wherein said upwardly opening mouth is surrounded by a magnetic annulus.

5. The apparatus defined in claim 1 including a protective screen covering, disposed in the region of said mouth.

6. The apparatus defined in claim 5 wherein said screen covering is a metallic mesh screen.

7. The apparatus defined in claim 1 including means for releasably retaining a fishing fly in a position adjacent said upwardly opening mouth.

8. The apparatus defined in claim 1 wherein said vessel tapers upwardly and inwardly to said upwardly opening mouth, thereby providing a relatively constricted opening.

9. The apparatus defined in claim 2 including an annular shroud depending from the bottom surface of said vessel and arranged to surround the upper portion of a cigarette lighter held by said resilient clamping means.

10. The apparatus defined in claim 9 wherein said shroud includes a plurality of apertures.

11. The apparatus defined in claim 2 including spring biasing means for engaging valves means on a cigarette lighter, to maintain said valve means open.

12. The apparatus defined in claim 11 wherein said spring bias means includes a piston mounted for axial movement within a housing mounted on said vessel, and a helical compression spring within said housing for biasing said piston downwardly.

* * * * *